United States Patent
Ng et al.

(10) Patent No.: US 8,488,308 B2
(45) Date of Patent: Jul. 16, 2013

(54) SEALED FORCE-BASED TOUCH SENSOR

(75) Inventors: Chin Y. Ng, Maplewood, MN (US); Paul J. Cobian, Woodbury, MN (US); Sherman L. Bartz, St. Paul, MN (US); Hung T. Tran, Woodbury, MN (US); Lewis H. LeVasseur, Burnaby (CA)

(73) Assignee: 3M Innovative Properties Company, St. Paul, MN (US)

( * ) Notice: Subject to any disclaimer, the term of this patent is extended or adjusted under 35 U.S.C. 154(b) by 2853 days.

(21) Appl. No.: 10/365,654

(22) Filed: Feb. 12, 2003

(65) Prior Publication Data

US 2004/0156168 A1  Aug. 12, 2004

(51) Int. Cl.
*H05K 5/00* (2006.01)
*G06F 3/041* (2006.01)

(52) U.S. Cl.
USPC ............................ 361/679.3; 345/173

(58) Field of Classification Search
USPC ............... 361/681, 679, 682, 679.3; 345/173, 345/174, 175, 176, 177, 178, 156, 157, 158
See application file for complete search history.

(56) References Cited

U.S. PATENT DOCUMENTS

| 4,355,202 A | 10/1982 | DeCosta et al. |
| 4,511,760 A | 4/1985 | Garwin et al. |
| 5,241,308 A * | 8/1993 | Young ............................ 341/34 |
| 5,488,873 A * | 2/1996 | Delmas et al. ........... 73/862.627 |
| 5,714,694 A | 2/1998 | Diessner |
| 5,854,625 A | 12/1998 | Frisch et al. |
| 6,411,287 B1 | 6/2002 | Scharff et al. |
| 6,429,846 B2 * | 8/2002 | Rosenberg et al. ........... 345/156 |
| 6,532,152 B1 * | 3/2003 | White et al. ................... 361/692 |
| 2002/0149571 A1 * | 10/2002 | Roberts ......................... 345/174 |

FOREIGN PATENT DOCUMENTS

| WO | WO 02/084244 | 10/2002 |
| WO | WO 02/084578 | 10/2002 |
| WO | WO 02/084579 | 10/2002 |
| WO | WO 02/084580 | 10/2002 |

* cited by examiner

*Primary Examiner* — Hung Ngo
(74) *Attorney, Agent, or Firm* — Robert S. Moshrefzadeh

(57) ABSTRACT

The present invention provides a display seal for a force-based sensor assembly that includes a flexible membrane having inner and outer surfaces, and first and second sides. The first side of the membrane is capable of being mounted to a housing of the assembly, such as a frame or bezel, and the second side of the membrane is capable of being mounted to a touch surface of a touch sensitive structure of the assembly. The seal, when mounted to the housing and the screen, is capable of creating a seal around the screen without passing extraneous forces to the transducers.

10 Claims, 13 Drawing Sheets

SEALED FORCE-BASED TOUCH SENSOR

BACKGROUND OF THE INVENTION

1. Field of Invention

The present invention relates to screen seals for touch sensitive display devices and, more particularly, to seals for force-based touch sensor assemblies.

2. Related Art

The popularity of touch screens has increased significantly over the past several years. Many different technologies have been explored in an effort to produce a high-quality touch sensor that is reliable and cost effective. Examples of touch sensor technologies include capacitive, resistive, near field imaging (NFI), acoustical wave, infrared, and force. Common applications for touch sensors include computer monitors and mobile and handheld devices, such as personal digital assistants (PDAs).

Touch sensors typically possess features and qualities that are unique for a given technology. Each type of touch sensor technology presents specific challenges related to, for example, the recognition of a touch input, the determination of the position of a touch input to a touch sensitive structure of the sensor, reliability, size, weight, and cost. The requirements for force-based touch sensors present their own set of challenges for attaining a viable and reliable touch system. One feature that is particularly unique to some force-based touch technologies is the desirability for the touch surface to be movable relative to the frame and bezel of the device so that the displacement can be measured as indicative of the applied touch force. Known sealing methods and structures, when applied between the movable screen and the frame and bezel, introduce a sufficient amount of extraneous force input to the touch system that may adversely affect touch input measurements.

In order to create a seal, many touch sensitive applications use the device bezel to press firmly around the edges of a touch-equipped display screen or display overlay module. This arrangement provides a dust and/or liquid seal, and may also serve to stiffen and align the bezel. With force-based touch devices, it may be desirable that the bezel and/or frame of the device not rest directly against the display screen, since the variable handling forces transmitted to the screen when touching the bezel and/or frame can interfere with touch location accuracy.

Another challenge for many touch sensors relates to how they are mounted to a display device. It is common practice to retrofit existing display devices with a touch sensitive system rather than to create a unique display device design that addresses the specific needs of a touch sensitive sensor. It is also common for some manufactures of touch sensitive display devices, for example, display devices with resistive and capacitive touch systems, to use a precalibrated, self-contained touch system that can be dropped into an existing display device. Such self-contained touch systems provide some advantages such as increased ease in assembling the display device, and improved quality control because the self-contained touch system can be tested by the sensor manufacture prior to being mounted to the display device.

SUMMARY OF THE INVENTION

In one aspect of the invention, the present invention provides a seal for a force-based touch sensor that includes a flexible membrane having inner and outer surfaces, and first and second sides. The first side of the membrane is capable of being mounted to a housing of the display, such as a frame or bezel, and the second side of the membrane is capable of being mounted to a touch sensitive surface of a screen of the display. The membrane, when mounted to the housing and the screen, is capable of providing a seal between the housing and the screen so as to prevent foreign objects such as liquids and particles from passing between the housing and the screen.

In another aspect of the invention, the present invention provides a self-contained force-based touch sensor assembly that includes a frame having inner and outer surfaces, a screen having inner and outer surfaces, a transducer positioned to sense forces passing through the screen due to touch inputs on the screen, and a membrane having first and second surfaces and first and second sides. The sensor assembly may also include a spring positioned between the inner surface of the frame and the screen to exert a pre-load force between the screen and the transducer. The membrane is mounted to the screen and the frame and is capable of forming a complete seal between the frame and the screen.

In another aspect of the invention, the present invention provides a method of assembling a force-based touch sensor assembly. The assembly includes a frame, a screen having first and second surfaces, and a membrane having first and second sides and first and second surfaces. The method includes the steps of retaining the screen within boundaries of the frame, securing the first side of the membrane to the screen, and securing the second side of the membrane to the frame. The membrane, when mounted to the frame and screen, is capable of creating a seal between the frame and the screen so as to inhibit passage of foreign objects to an area between the frame and the inner surface of the screen.

In another aspect of the invention, the present invention provides a method of dissipating bezel forces in a force-based touch display assembly. The display assembly includes a sensor assembly having a sensor screen and a sensor frame, a bezel, a display, and a system frame. The method includes the steps of assembling the display assembly with the display adjacent the system frame, the sensor assembly adjacent the display, and the bezel adjacent the sensor assembly. Due to the arrangement of the assembly, an external force applied to the bezel is translated to the sensor frame and the system frame such that a threshold input to the sensor screen is not exceeded.

In another aspect of the invention, the present invention provides a method of producing a sealing membrane member for a force-based touch sensor assembly. The method includes the steps of aligning strips of membrane in a shape that approximates a periphery of a touch sensitive structure of the force-based touch sensor assembly, and securing the strips of membrane together to form a continuous sealing membrane. The membrane is configured so as to be capable of being secured to the touch sensitive structure and a frame of the forced-based touch sensor assembly to form a complete seal between the touch sensitive structure and the frame.

In another aspect of the invention, the present invention provides a self-contained force-based touch sensor assembly that includes a frame, a touch sensitive structure mounted to the frame, a force activated transducer positioned between the touch sensitive structure and the frame, and a sealing membrane secured to the frame and the touch sensitive structure to form a complete seal there between. The assembly is capable of being dropped into an existing display assembly to make the display assembly sensitive to touch inputs.

In yet another aspect of the invention, the present invention provides a seal for a force-based touch sensor assembly. The assembly includes a frame, a touch sensitive structure, a sealing membrane, and at least one force activated transducer associated with the touch sensitive structure. The membrane includes a continuous piece of compliant material secured to the touch sensitive structure and the frame. The compliant material is configured such that a maximum force exerted upon the touch sensitive structure by the compliant material is at least an order of magnitude less than a minimum recognized touch input force to the touch sensitive structure.

In another aspect of the invention, the present invention provides a force-based touch display device that includes a housing, a movable force-based touch sensitive screen, and a sealing means configured to provide a liquid and particle seal between the screen and the housing. The membrane configuration promotes essentially unrestricted motion of the screen without passing extraneous forces to the screen that result in false touches to the screen or skewing of touch location determination of intended touches to the screen. The sealing means may be a continuous, uninterrupted membrane.

In another aspect of the invention, the present invention provides a force-based touch sensor assembly that includes a bezel, a screen having inner and outer surfaces, a seal, and a force activated transducer positioned adjacent the screen for detecting forces pushing through the screen due to a touch input. The seal includes a flexible membrane having first and second surfaces and first and second sides. The first side of the membrane is capable of being mounted to the bezel, and the second side of the membrane is capable of being mounted to the screen. The membrane is configured and arranged so that the membrane, when mounted to the bezel and screen, creates a seal between the bezel and the screen without passing extraneous forces to the transducers.

BRIEF DESCRIPTION OF THE INVENTION

DETAILED DESCRIPTION OF THE PREFERRED EMBODIMENT

Figure 1:
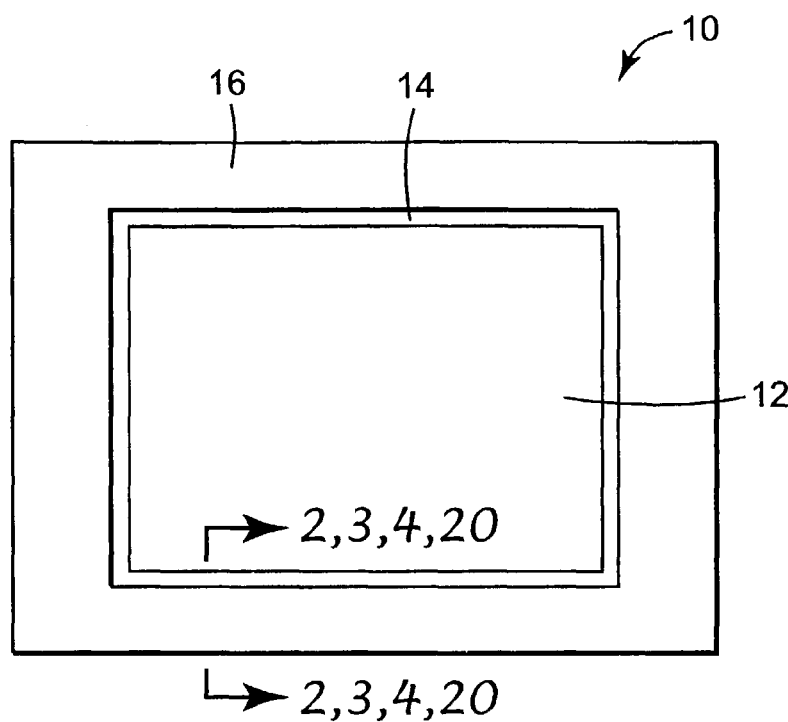
FIG. 1 is a front plan view of a display assembly having a force-based touch sensor assembly according to principles of the invention.

The present invention provides novel methods and apparati for sealing a force-based touch sensor assembly. In one of its aspects, the invention provides a sensor assembly sealing membrane that is capable of forming a seal between a sensor assembly screen and a housing of the sensor assembly, such as a frame or bezel. The terms "seal", "seal member", and "display seal" as used herein to describe structure that provides a sealing function are synonymous with the terms "membrane" and "sealing membrane".

As described in more detail below, the membrane may be implemented into a display system in a very simple, cost effective way that is easy to manufacture and is widely applicable for a variety of different touch-related applications. In particular, the membrane of the present invention may be used in computer monitors, mobile and handheld devices, and industrial applications that require touch technology. The membrane of the present invention is particularly useful in force-based touch sensitive devices that include a force sensitive structure that is free to move relative to a housing of the sensor assembly. In a broad sense, the membrane is configured to form a seal between at least one surface of the sensor assembly screen and a portion of the sensor assembly frame so as to prohibit, or at least inhibit foreign objects from entering between the screen and the housing.

A force-based touch sensor assembly typically requires a frame that houses and mounts a touch sensitive structure that has a touch sensitive surface. One example of a touch sensitive structure is a sensor screen ("screen") with one primary surface of the screen that acts as a touch sensitive surface ("touch surface"). Typically, some type of force-activated sensor or transducer is positioned between the frame and the screen to sense forces passing through the screen due to touch inputs to the screen, measure those forces, and determine the location of the touch input with desired accuracy. In order to determine a touch input location, the display screen should be in constant contact with the sensors, which are typically spaced around a periphery of the screen. Also, the screen as a whole is preferably isolated sufficiently from extraneous forces that the effects of such forces on the force surface is less than a minimum threshold for input force. Extraneous forces in excess of a threshold amount may cause inaccuracies in determining an intended touch input, which would result in a touch sensor that does not work properly.

Exemplary force-based touch sensor assemblies may include some type of biasing member to apply a proper preload force to the screen to hold the screen against the sensors, while allowing the screen to move so as to be sensitive to intended touch inputs. Examples of such force-based displays are disclosed herein and further disclosed in pending applications WO 02/084244, WO 02/084578, WO 02/084579, and WO 02/084580, which are each incorporated herein by reference in their entirety.

One example of a display assembly ("display") illustrating principles of the present invention is display 10 shown in FIG. 1. Display 10 includes a bezel 16 and a force-based touch sensor assembly that includes a touch sensitive structure 12, a membrane 14, a transducer (not shown), and a frame (not shown). Although membrane 14 is visible from the front view of the display shown in FIG. 1 (also see membrane 314 of FIG. 4), in some embodiments membrane 14 may be recessed behind bezel 16 so as to be hidden from a front view (for example, see membrane 114 and 214 of FIGS. 2 and 3).

Figure 2:
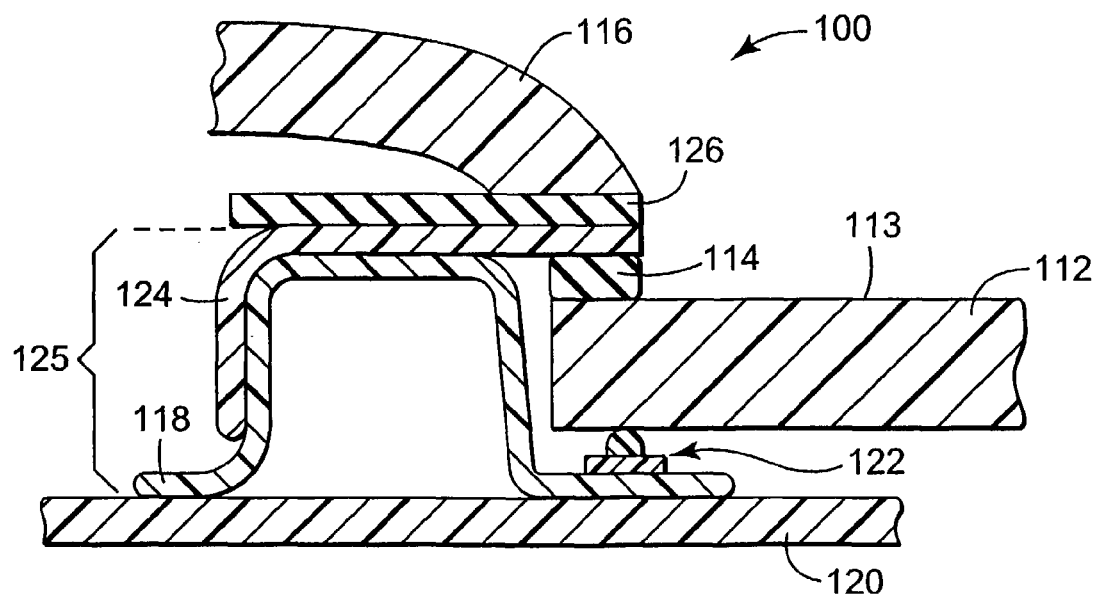
FIG. 2 is a cross-sectional view taken along line A-A of the display assembly shown in FIG. 1 illustrating one example of a sensor assembly according to principles of the invention.
Figure 3:
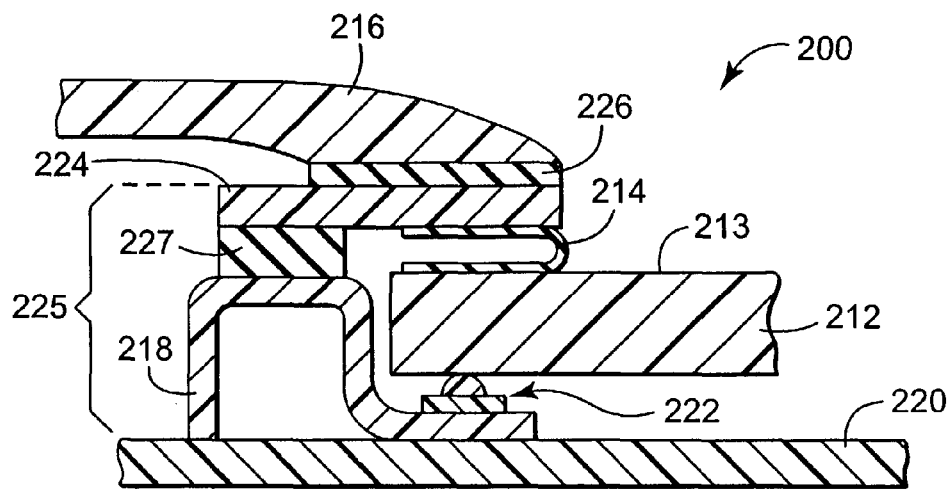
FIG. 3 is a cross-sectional view taken along line A-A of the display assembly shown in FIG. 1 illustrating a second example of a sensor assembly according to principles of the invention.
Figure 4:
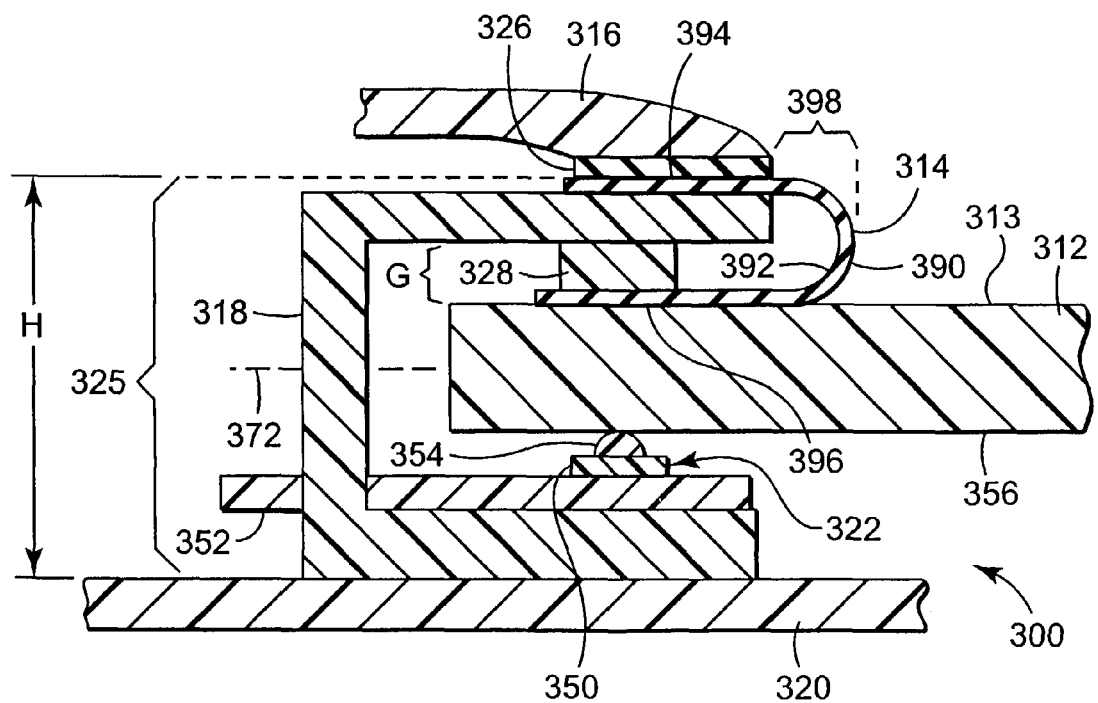
FIG. 4 is a cross-sectional view taken along line A-A of the display assembly shown in FIG. 1 illustrating a third example of a sensor assembly according to principles of the invention.

FIGS. 2-4 illustrate several embodiments of a display assembly that may be taken from the indicated cross-section of display 10 illustrated in FIG. 1. FIG. 2 illustrates a display 100 that includes a sensor assembly 125 having a screen 112, a membrane 114, lower frame 118, an upper frame 124, and a transducer 122. Display 100 may also include a bezel 116, a device subframe 120, and a bezel seal 126. In this embodiment, sensor assembly 125 is easily assembled by mounting transducer 122 to lower frame 118, placing screen 112 in contact with transducer 122, and mounting membrane 114 to screen 112 and upper frame 124. Sensor assembly 125 is preferably a self-contained sensor assembly that is capable of being assembled and tested separately from the device 100. If desired, at a later time, sensor assembly 125 may be mounted to the device subframe 120, and a device bezel 116 brought in contact with bezel seal 126 so as to form a display 100 that is sealed between bezel 116, frame 124 and a touch surface 113 of screen 112.

Another embodiment of a display 200 is illustrated in FIG. 3. Display 200 includes a sensor assembly 225 having a screen 212, a membrane 214, a lower frame 218, an upper frame 224, and a transducer 222. Display 200 also includes a bezel 216, a device subframe 220, and a bezel seal 226. In this embodiment, sensor assembly 225 is easily assembled by mounting transducer 222 to lower frame 218, placing screen 212 in contact with transducer 222, and mounting membrane 214 to screen 212 and upper frame 224. Sensor assembly 225 is preferably a self-contained sensor assembly that is capable of being assembled and tested separately from the device 200. If desired, sensor assembly 225 may be mounted to device subframe 220, a bezel seal 226 applied to upper frame 224, and a device bezel 216 brought in contact with bezel seal 226 so as to form a display 200 that is sealed between bezel 216 and a touch surface 213 of screen 212.

The configuration of membrane 214 may provide some advantages over the configuration of membrane 114 shown in FIG. 2. As will be discussed below, membrane 214 may have a variety of different designs to accomplish the intended purpose of providing a seal between touch surface 213 and upper frame 224 or bezel 216 of display 200 so as to prohibit, or at least inhibit passage of foreign objects into an area in which transducer 222 resides.

A third example of a display 300 incorporating principles of the present invention is illustrated in FIG. 4. Display 300 includes a screen 312, a membrane 314, a frame 318, and a transducer 322. Display 300 may also include a bezel 316, a device subframe 320, and a bezel seal 326. A sensor assembly 325 that includes some of the components of display 300 may be independently mounted to device subframe 320 and positioned adjacent bezel 316. The membrane 314 is unique from membranes 114 and 214 in that one side of the membrane is secured to a touch surface 313 of screen 312, and the opposite side of membrane 314 is secured to an outer surface of frame 318 between frame 324 and bezel 316. Thus, when assembling display 300, the membrane 314 is secured to screen 312, screen 312 is mounted within frame 318 adjacent transducer 322, and membrane 314 is secured to an outer surface of frame 318. In an alternative embodiment, membrane 314 may be secured to bezel 316 rather than frame 324.

Figure 5A:
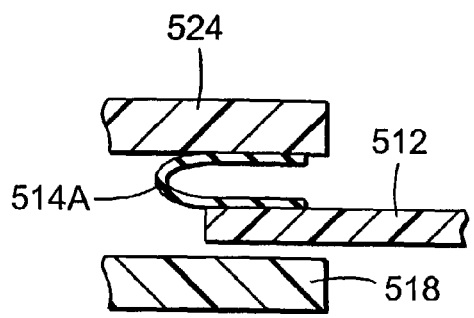
FIG. 5A is a cross-sectional view of one example of a seal configuration illustrating principles of the invention.
Figure 5B:
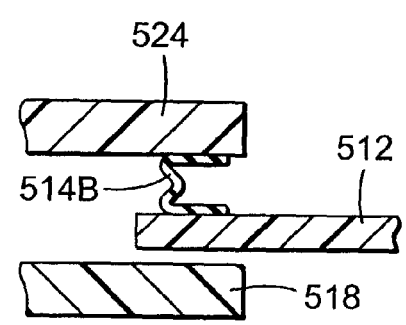
FIG. 5B is a cross-sectional view of another example of a seal configuration illustrating principles of the invention.
Figure 5C:
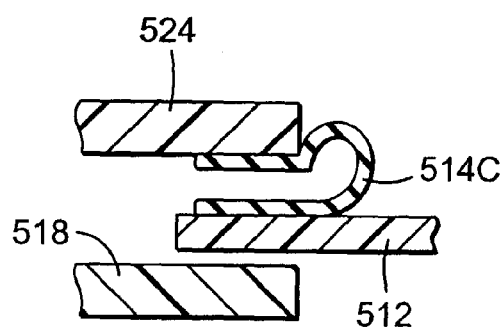
FIG. 5C is a cross-sectional view of another example of a seal configuration illustrating principles of the invention.
Figure 5D:
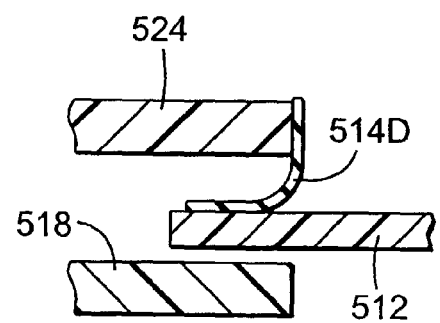
FIG. 5D is a cross-sectional view of another example of a seal configuration illustrating principles of the invention.
Figure 5E:
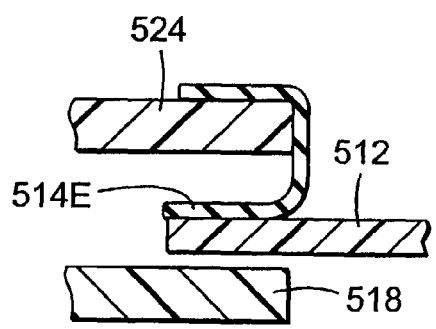
FIG. 5E is a cross-sectional view of another example of a seal configuration illustrating principles of the invention.
Figure 5F:
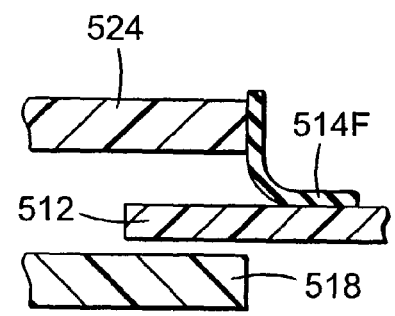
FIG. 5F is a cross-sectional view of another example of a seal configuration illustrating principles of the invention.
Figure 5G:
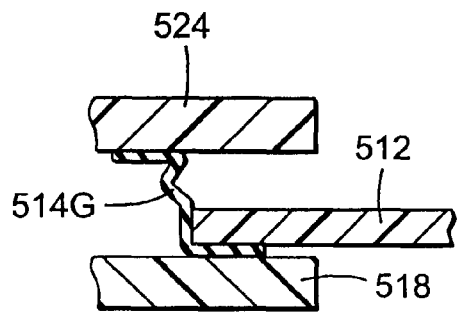
FIG. 5G is a cross-sectional view of another example of a seal configuration illustrating principles of the invention.
Figure 5H:
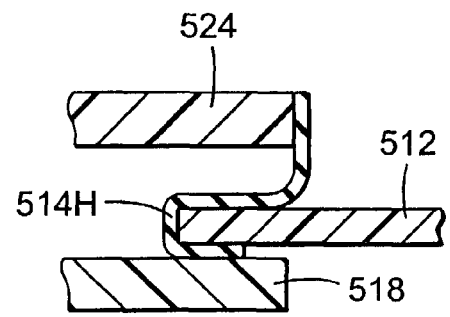
FIG. 5H is a cross-sectional view of another example of a seal configuration illustrating principles of the invention.
Figure 5I:
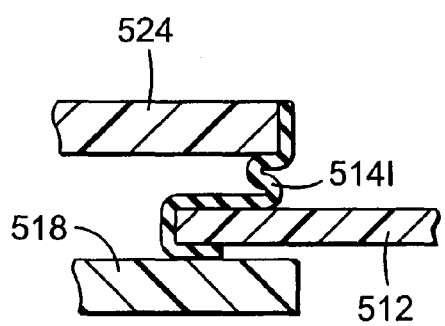
FIG. 5I is a cross-sectional view of another example of a seal configuration illustrating principles of the invention.
Figure 5J:
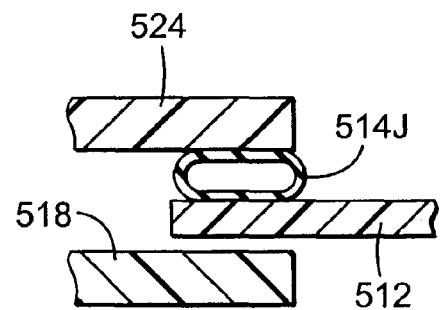
FIG. 5J is a cross-sectional view of another example of a seal configuration illustrating principles of the invention.
Figure 5K:
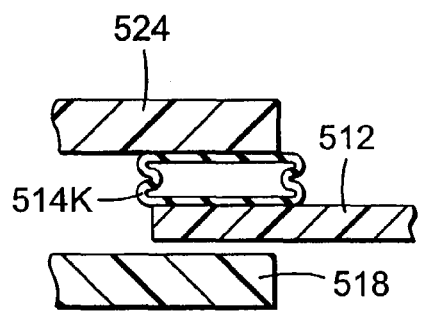
FIG. 5K is a cross-sectional view of another example of a seal configuration illustrating principles of the invention.
Figure 5L:
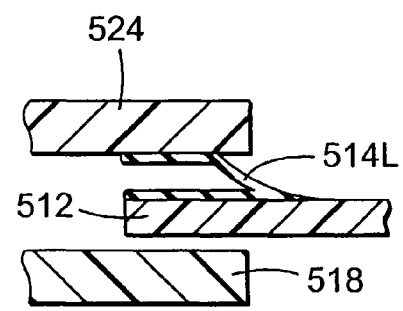
FIG. 5L is a cross-sectional view of another example of a seal configuration illustrating principles of the invention.
Figure 5M:
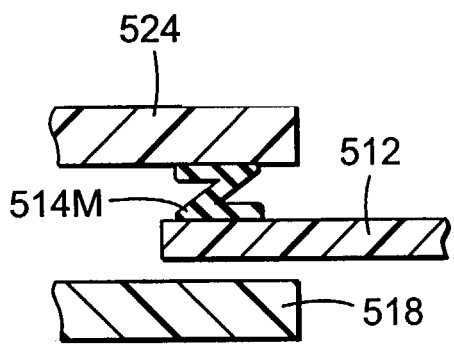
FIG. 5M is a cross-sectional view of another example of a seal configuration illustrating principles of the invention.
Figure 5N:
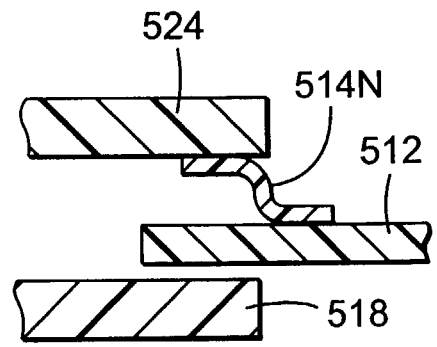
FIG. 5N is a cross-sectional view of another example of a seal configuration illustrating principles of the invention.
Figure 5O:
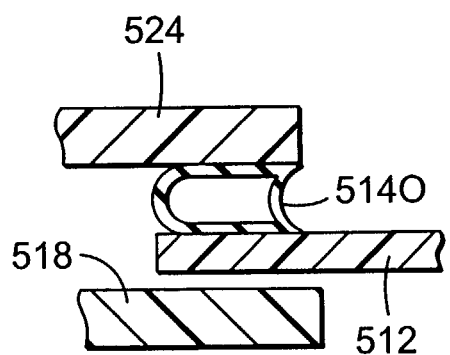
FIG. 5O is a cross-sectional view of another example of a seal configuration illustrating principles of the invention.

Membranes 114, 214 and 314 may be interchangeable or may be replaced by membranes with alternative configurations, such as those configurations illustrated in FIGS. 5A-O. Each of FIGS. 5A-O include a first support member 518, a second support member 524, a screen 512, and one of the membrane configurations 514A-O. The membrane configurations illustrated in FIGS. 5A-O are not comprehensive, but only illustrative of the variety of different embodiments that may be possible to form a seal between the screen 512 and a support member 524. Support member 524 may be a portion of a frame, as shown in FIG. 4, or may be a bezel or other structural element. Although each of the membrane configurations 514A-O may provide certain advantages, each design is intended to provide the required seal for a particular design without exerting forces above a threshold amount that would cause inaccurate determinations of touch locations on a touch surface of screen 512.

In this context, a threshold amount of force is the minimum amount of force applied to the screen that is required in order for the force to be recognized by the sensor assembly. Threshold can be adjusted, for example, to suit the environment or intended application. Threshold can be automatically adjusted based on use history. In order for a sensor assembly of the present invention to work as desired, the screen (or other touch sensitive structure) should be isolated from the influence of any force being transmitted to the sensors above the threshold amount, except for intended touch inputs.

Typically, a threshold is based on a mathematical algorithm that takes into consideration all forces applied to the sensor, including the amount and the direction in which the forces are applied to the sensor. A processor may be used to make the required calculations to determine if the input forces exceed threshold values. Ultimately, threshold values are used in part to distinguish between "noise" forces (forces not intended as a touch input) and intended touch inputs.

One exemplary sensor assembly has a threshold of about four ounces. As a result, it is desired that the membrane not impose or transmit forces less than a total of four ounces applied locally to the display screen at any given time, even when extraneous forces are applied to a device in which the sensor assembly is mounted. Preferably, the membrane of a sensor assembly is designed to exert far less than the minimum recognized force applied to the display screen under any conditions. Most preferably, the membrane applies a force at least one order of magnitude less than the threshold force. In some applications, depending on the seal configuration and material characteristics, the membrane imposes a force on the touch sensitive structure of $1/50$, $1/100$ or less of the threshold value.

Even if the membrane applies forces below that of the threshold amount, a non-uniform distribution of forces from the membrane around the periphery of the touch sensitive display screen may skew a touch location determination. Non-uniform distribution of membrane forces may be particularly evident when using strips of compliant material, such as foam-like material, as a seal and there is any non-uniformity in the gap between the housing and the screen. Additionally, even if it were possible to maintain a perfectly uniform gap between the screen and the housing and a uniform force from the membrane to the screen around its periphery, a touch force applied to the screen deflects the screen causing a natural biasing force to arise.

In some embodiments, the space filled by bezel seals 126, 226, 326, between the frame and the bezel in displays 100, 200, 300, respectively, does not include a seal member. For example, that space may be empty, filled with a non-functional filler, or filled with an adhesive. Because there are numerous applications for the seal assembly of the present invention, a customer mounting a seal assembly of the present invention to a display device rather than the manufacturer of the seal assembly may be required to decide what to do with this space and how to mount the seal assembly to a display device. A sensor that is pre-sealed and self-contained may make it easier for the manufacturer of the sensor to ensure that the customer receives a sensor that works properly, independent from the selected bezel seal method, allowing a customer a high degree of flexibility in assembly and mounting of the sensor to a display device.

A sensor assembly that is self-contained and pre-sealed may make it possible for the sensor assembly to be added on to an existing display device. For example, the sensor may be capable of being hung on an exterior of the display device, outside of the bezel and overlaying the display screen of the device. In other embodiments, the touch sensitive structure of the sensor assembly may also be a flat panel display device such as an LCD display or organic electroluminescent display, so that the sensor assembly can provide touch capabilities and also take the place of a display of the device.

Figure 6:
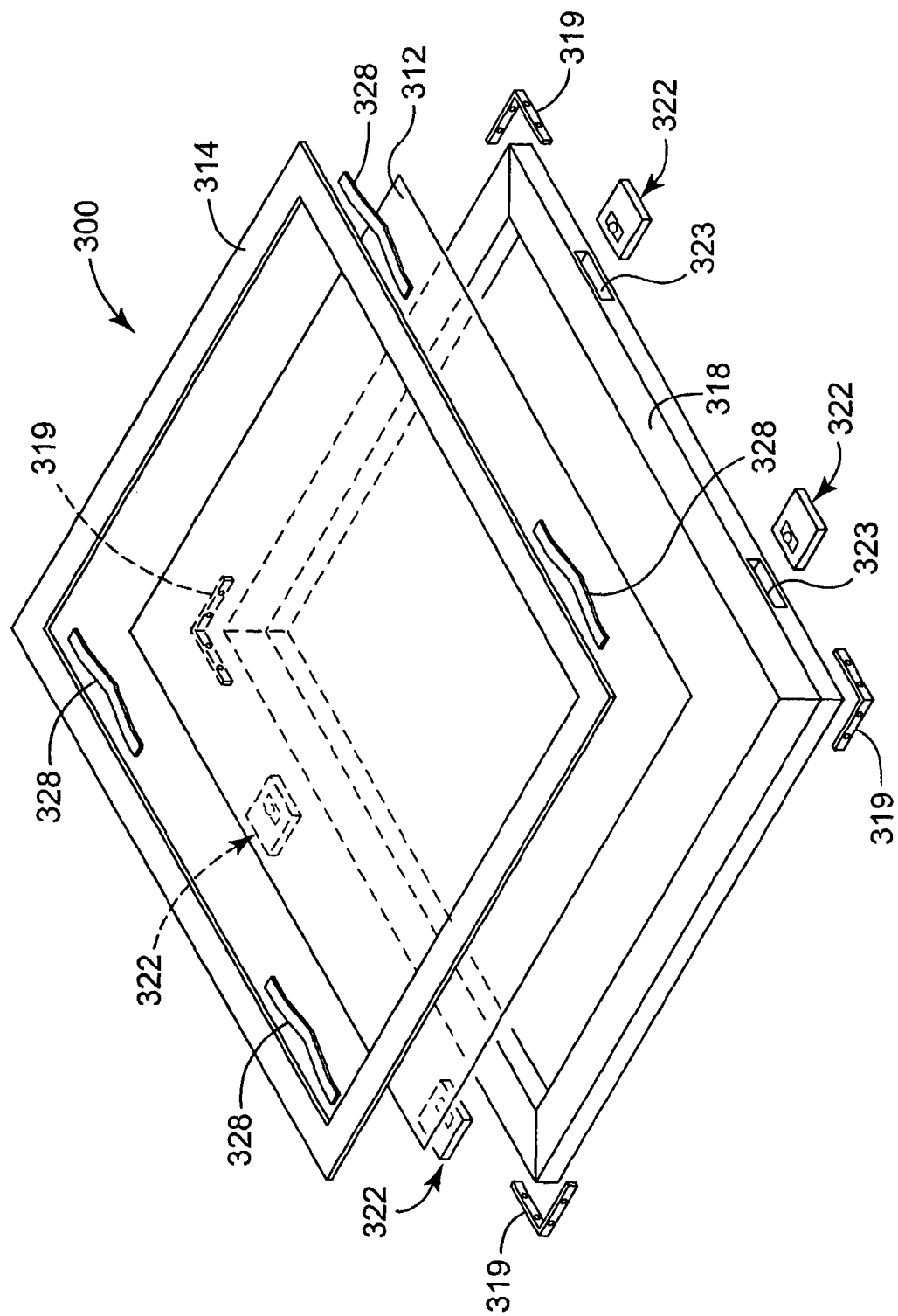
FIG. 6 is an exploded view of the sensor assembly shown in FIG. 4 without a bezel member.
Figure 7:
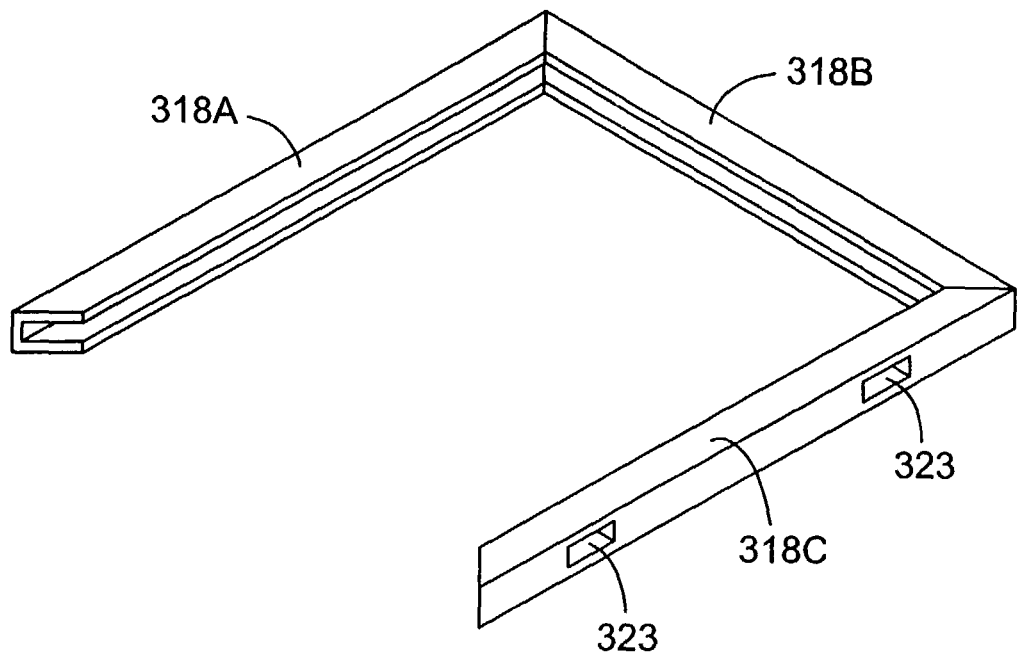
FIG. 7 is a perspective view of three segments of a sensor assembly frame having a C-shaped cross-section aligned together according to principles of the invention.

FIG. 6 illustrates an exploded view of one embodiment of display 300 without the bezel 316 shown in FIG. 4. The frame 318 of display 300 may be composed of four segments that represent each of the four sides of the frame. The segments may be held together with welding, adhesive, or some type of fastener or bracket such as bracket 319 shown in FIG. 6. A second frame bracket (not shown) may be used in the interior of frame 318 at the connecting point of two segments, whereas bracket 319 is used on an exterior surface at the connecting point between two segments of the frame.

Frame 318 may also include apertures 323 formed in the frame at spaced locations around an outer periphery of the frame for easily mounting force-based transducer 322 to the frame. Transducer 322 may include a base 350 mounted to a printed circuit board 352. A displacement contact 354 may be mounted to the base 350 in a position so as to be in contact with an inner surface 356 of screen 312 (see FIG. 4).

Figure 8:
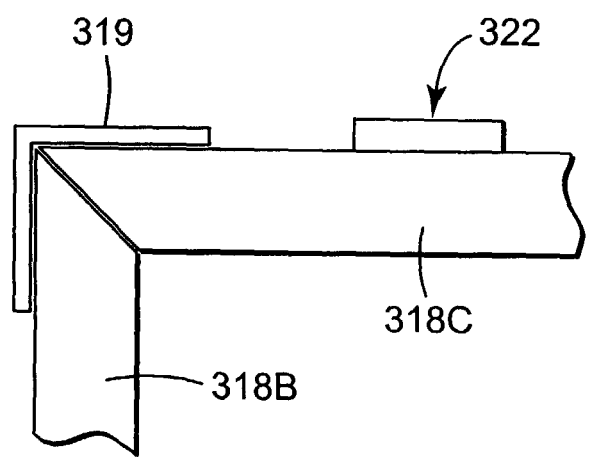
FIG. 8 is a plan view of a one corner of the sensor assembly frame shown in FIG. 7 with a corner bracket and transducer mounted to the sensor assembly frame.
Figure 9:
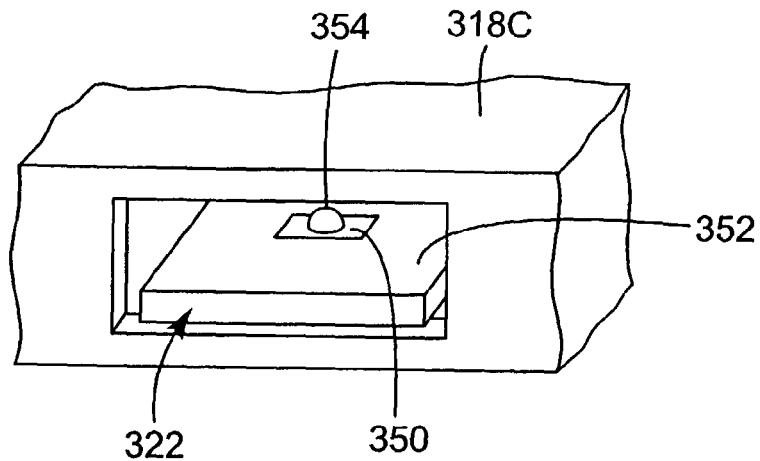
FIG. 9 is a perspective view of a transducer shown in FIG. 6 mounted to the inside of the sensor assembly frame.
Figure 10:
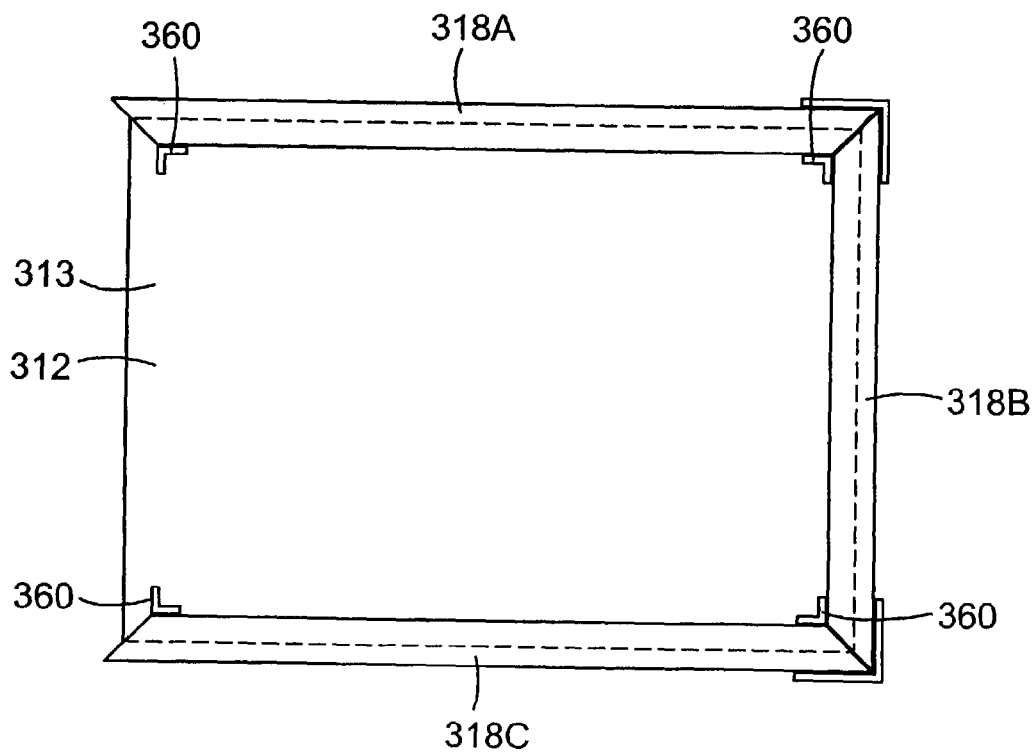
FIG. 10 is a plan view of the display frame of FIG. 8 with a sensor assembly screen mounted to the sensor assembly frame and markings on the screen for alignment of the screen and a sensor assembly seal relative to the frame.

One method of assembling a sensor of the present invention is described with reference to sensor 325 (FIG. 4) and FIGS. 7-15. First, three segments 318a, 318b, 318c of frame 318 are assembled together so as to form a frame with three sides having an open end for receiving screen 312. The segments 318a, 318b, 318c may be secured together in a variety of ways, such as using one of brackets 319 as shown in FIG. 8. Brackets 319 are secured to the frame segments using fasteners, adhesives, or a like manner of securing multiple members together. Before or after the frame segments 318a, 318b, 318c are assembled together, transducers 322 may be mounted to the frame segments through openings 323 (see FIG. 7). The transducers 322 are positioned within frame segments 318a and 318c such that contact 354 is positioned so as to contact screen 312 (see FIG. 9) when the screen 312 is inserted into the assembled frame segments 318a, 318b, 318c, as shown in FIG. 10.

Figure 11:
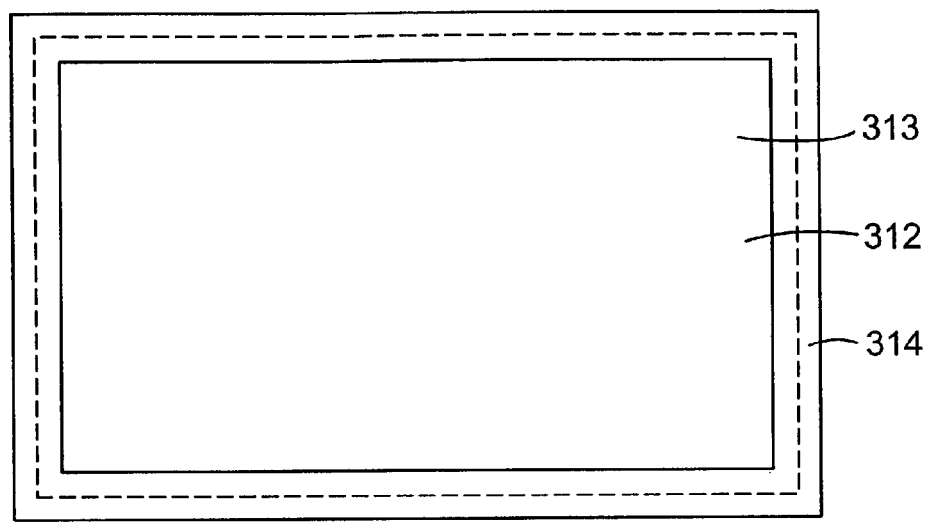
FIG. 11 is a plan view of the sensor assembly screen shown in FIG. 10 with the sensor assembly seal secured to the sensor assembly screen.

After screen 312 is positioned with touch surface 313 of screen 312 facing outward (see FIG. 10), markings 360 may be made at each of the inside corners where the frame segments are secured together. Markings 360 are used to align membrane 314 to the screen 312, as shown in FIG. 11.

Figure 12:
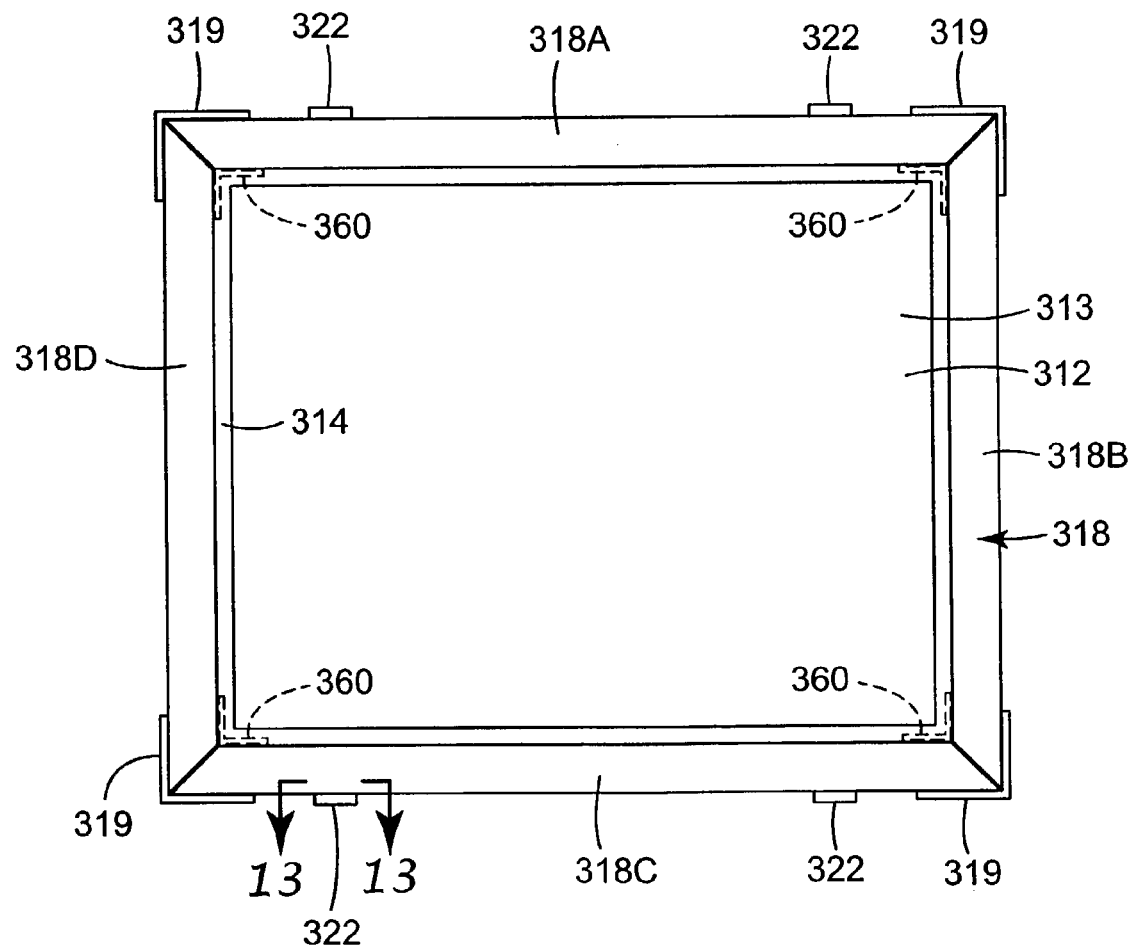
FIG. 12 is a plan view of the sensor assembly screen shown in FIG. 11 mounted in a completely assembled sensor assembly frame having four segments.
Figure 13:
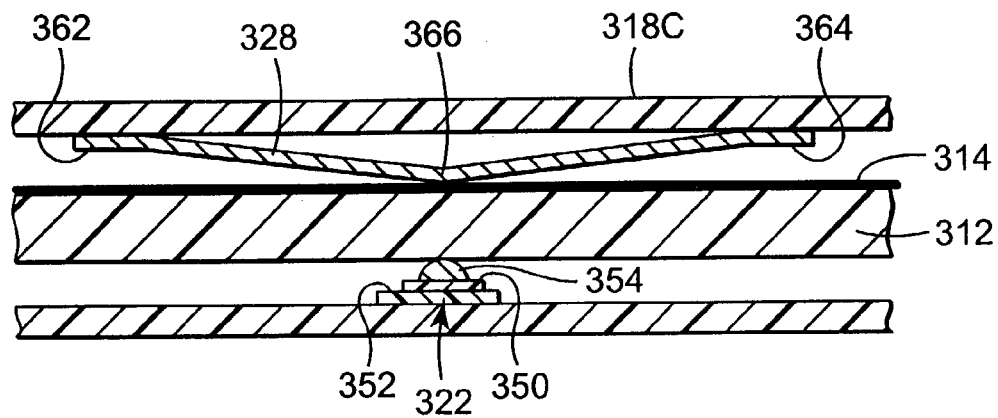
FIG. 13 is a cross-sectional view of the sensor assembly shown in FIG. 12 taken along line 13-13.
Figure 14:
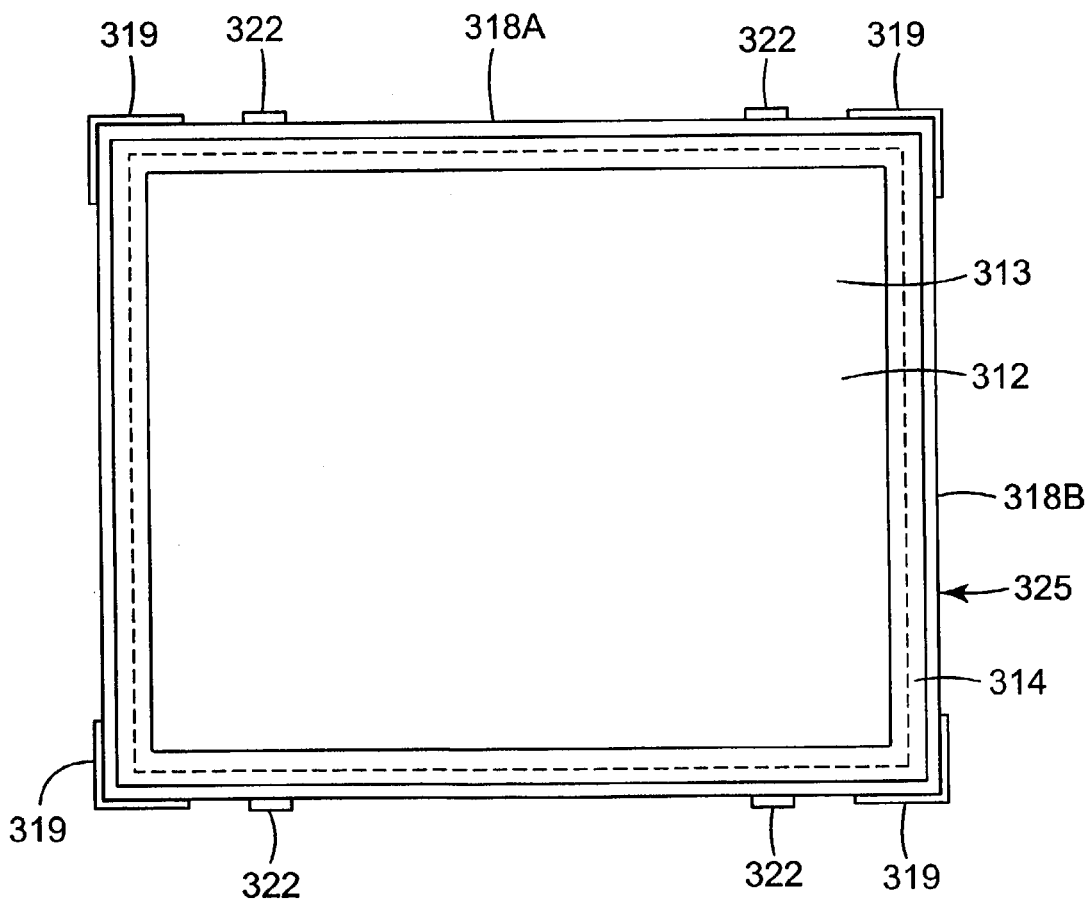
FIG. 14 is a plan view of the sensor assembly of FIG. 12 with the sensor assembly seal mounted to the sensor assembly frame having four segments, illustrating one example of a complete sensor assembly according to principles of the invention.

With the membrane 314 mounted to the touch surface 313 of screen 312, the screen is prepared for being mounted to frame 318 and the frame completely assembled by securing frame segment 318d to frame segments 318a, 318b, as shown in FIG. 12. In this way, screen 312 is retained within the boundaries of frame 318. FIG. 12 shows markings 360 realigned with the frame 318 and with membrane 314 prepared for mounting to frame 318. Prior to securing membrane 314 to frame 318, preload springs 328 may be positioned between touch surface 313 of screen 312 at an inner surface of frame 318, as shown in FIG. 4. The cross-sectional view of FIG. 13, taken along lines 13--13 of FIG. 12, illustrates the preload spring 328 in position between frame segment 318c and screen 312. Preferably, preload spring 328 includes first and second ends 362, 364 and a midpoint 366 that is positioned directly above transducer 322. Thus, the preload spring is positioned so as to impose its maximum preload force directly above transducer 322 to ensure constant contact between screen 312 and contact 354. In other embodiments, different types of springs may be used to fulfill the same intended purpose of applying a preload force.

Figure 15:
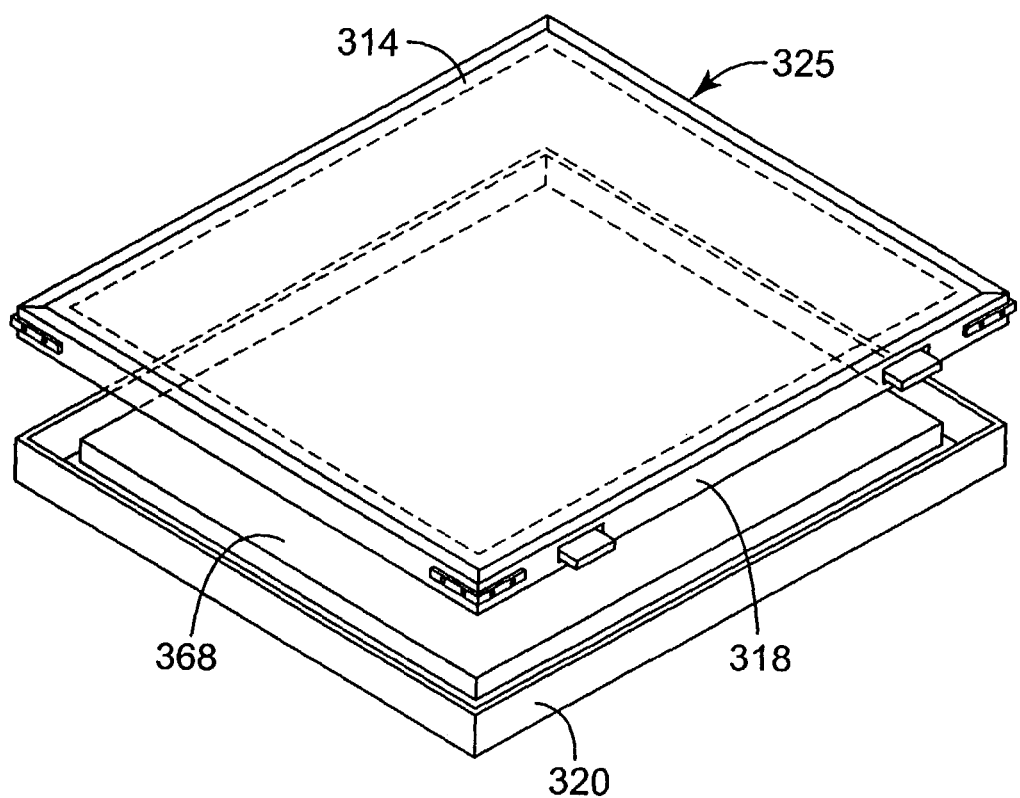
FIG. 15 is an exploded perspective view of an LCD monitor housing having mounted to it an LCD screen to which the sensor assembly shown in FIG. 14 may be mounted.

After the preload springs are in place, membrane 314 is adhered to the outer surface of frame 318, as shown in FIG. 4. With sensor 325 completely assembled (see FIG. 14), the sensor is prepared for being mounted to a subframe 320 and display screen 368, as shown in the exploded view of FIG. 15. FIG. 15 illustrates screen 368 mounted to subframe 320, and sensor 325 in position to be mounted to screen 368.

Another method of assembling a sensor may include sandwiching a screen, the transducers and any pre-loading elements between two "L" shaped frames that can be overlapped or interleaved at their edges to form a combined "C" shaped frame such as illustrated in FIG. 4. The two "L" frames can be secured or fastened together by any suitable means. Such an assembly method allows for vertical assembly of the components.

Figure 16:
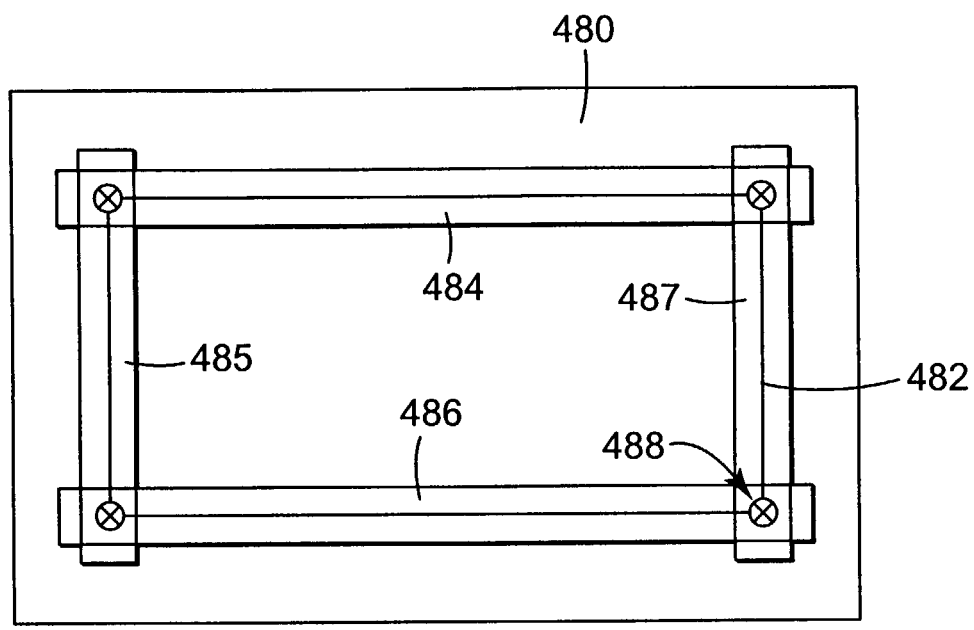
FIG. 16 is a plan view of a frame pattern with strips of seal material laid out for marking where the strips are to be secured together.
Figure 17:
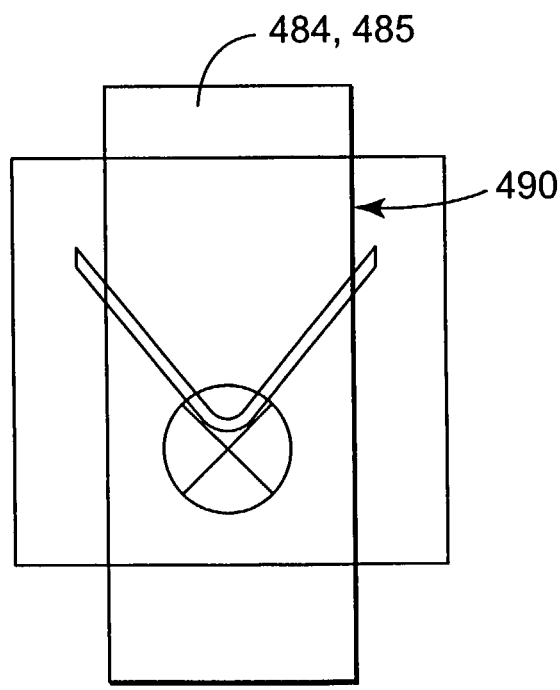
FIG. 17 is a plan view of a pair of strips of seal material shown in FIG. 16, positioned on a V-shaped anvil for cutting and welding the strips together.

As discussed using the examples above, there are many seal designs that may be used with the present invention. Membranes 114, 214, 314 and 514A-O are preferably continuous strips of material to enhance the sealing capabilities of the membrane. Regardless of the shape or configuration of the membrane, there are a variety of ways to produce the membrane to make it a continuous piece while providing the proper mounting to the frame, in particular at the junction between the frame segments (in the corners). One method of creating a continuous membrane is shown with reference to FIGS. 16 and 17. FIG. 16 includes a form 480 that includes an opening 482 comparable to the dimensions of a sensor screen (such as screen 312 shown in FIG. 4). Four strips of membrane 484-487 may be laid out on form 480 and properly marked with corner markings 488 that will be used when joining the strips together. FIG. 17 illustrates two pieces of material, such as strips 484, 485 that are aligned parallel to each other and positioned relative to an anvil 490 that, in this configuration, both cuts and bond strips 484, 485 together. Anvil 490 may ultrasonically or thermally bonds strips 484, 485 together while removing excess length from each of those strips. After all four strips 484-487 have been secured together to form a continuous membrane, the membrane is prepared for mounting to a sensor screen and a housing to provide the sealing functionality disclosed herein and described above.

In other embodiments, the sealing membrane may be composed of separate segments that are each individually mounted to the screen and the housing, rather than being one continuous piece. It is anticipated that there are methods of manufacturing a continuous membrane that do not require bonding multiple pieces of material together as described with reference to FIGS. 16 and 17, such as, for example, various types of molding (e.g., injection or dip molding).

Referring again to FIG. 4, the display membrane 314 is described in further detail. Typically, any of the display sealing membranes described herein has first and second opposing surfaces (referenced as surfaces 390, 392, respectively, for display 300). Most of the membrane embodiments disclosed herein also include first and second sides referenced as 394, 396, respectively, for display 300. Typically, an adhesive is applied to either the first or second surface of the membrane at each of the first and second sides of the membrane prior to mounting the membrane to the display screen and the housing. In other embodiments, the adhesive is first applied to the screen and the housing and then the first and second sides of the membrane are secured to the adhesive.

In one embodiment, the sealing membrane is made of a polyester, polyimide or polyamide film (e.g., Kapton®) having a thickness of about 0.001 to 0.002 L inches thick, and acrylic adhesive is applied at the first or second surface of each of the first and second sides where attachment of the membrane to the display screen and display frame is desired. The membrane may also be made of other material, for example, polyethylene, polypropylene, polyurethane, fluoropolymer (e.g., Teflon®), or polyvinylchloride. The membrane may also include a foam or foam-like material such as a porous foam, a composite material, rubber-like material, a gel, a membrane arranged to have an annealing cross section and filled with a gel or other compliant material, or any of a variety of other compliant materials or constructions. The membrane also may have a rectangular cross-section, such as membrane 114 shown in FIG. 2 or any other suitable cross section. Further, the membrane material preferably has the characteristics of being puncture resistant, deformable, durable, and resistant to failure due to exposure to chemicals.

Typically, the adhesive lies in a strip of about one-sixteenth inch wide at the first and second sides of the membrane. If the membrane is to be given a specific contour or shape, this may be done by a simple thermoforming or like operation, depending on the materials used for the film. The amount of freely flexing material between the contact points of the first and second sides of the membrane to the screen and the housing depends upon the characteristics of the material and the gap between the touch surface of the screen and the housing. There must also be enough material in the free flexing region (such as region 398 for display 300) to account for deformations in the frame due to unevenness of the subframe (such as subframe 320) or from applied external forces, the amount of displacement the display screen experiences when subjected to the touch force, and the small but typically unavoidable amount of lateral movement of the screen relative to the frame.

One benefit of the sealing membrane of the present invention is its inherent lateral stiffening functionality. Although the membrane is typically configured so as to allow adequate amounts of vertical (out of plane of the screen) movement of the display screen relative to the frame, the membrane typically allows very little lateral (in plane of the screen or XY plane) movement of the screen relative to the frame. Without a lateral stiffening member associated with the screen, the screen would be able to move in either the X or Y direction of the XY plane of the screen. Preferably, XY movement of the screen is limited as much as possible to avoid false touches and skewing of touch input determinations that may occur when the screen moves in the XY plane. A lateral stiffening member associated with the screen limits XY movement while allowing free movement of the screen in the normal direction (Z direction) to the XY plane of the screen.

In some embodiments, the film material from which the sealing membrane is made may include embedded materials or may be otherwise designed to allow flexure of the membrane in a direction normal to the screen while limiting deformation under tension or sheer forces in the lateral direction. In some embodiments, a separate lateral stiffening feature may be added in addition to the membrane. For example, a separate piece of stiffening material may be added between the screen and the frame to limit lateral movement of the screen relative to the frame, while the membrane provides little or no lateral stiffening to the sensor assembly.

Another embodiment of a sealing membrane of the present invention is a membrane or film that extends across the entire touch surface of the display screen with the outer periphery edge of the film being adhered to the display frame (not shown). This configuration may not be desirable for a force-based touch system because one advantage of a force-based sensor assembly is that no polymeric film layer exists to detract from its superior optical clarity and scratch resistance properties. However, this configuration may be desirable for industrial or highly contaminated applications that require an additional amount of protection or assurance of sealing between the touch surface of the screen and the housing of the display. Any of the sealing membranes disclosed herein may be made of a transparent material that is not easily detectable by a user of the display, or an opaque material so as to conceal sensor and other edge structures from the user's view.

In most instances, it is desirable for the sensor to have a complete, uninterrupted seal formed between the touch sensitive structure and the sensor frame. A complete, uninterrupted seal may be formed from a membrane that extends all the way around a periphery of the touch sensitive surface between the frame and touch sensitive surface. A complete, uninterrupted seal preferably prevents, or at least inhibits foreign objects, such as liquids, solid particles and even some types of gas molecules, from entering between the frame and the screen into an area in which the transducer resides.

FIGS. 2, 3 and 4 illustrate display embodiments having various frame designs. Each of these frame designs may be created using stamping, extruding, casting, molding or other methods required for a given material, to provide a continuous frame or segments of a frame that can be assembled together. The C-shaped design of frame 318 provides some advantages of strength and resistance to bending and torsion that are advantageous for maintaining a stable environment for screen 312. The display frame may be made of metal, metal alloys, polymers, reinforced polymers, and composites or like materials that provide the necessary characteristics for the invention. In one embodiment, the frame is made of extruded aluminum with four separate segments that are secured together with, for example, fasteners or welding. In other embodiments, each segment of the frame may be made of multiple pieces, such as frame portions 218, 224 shown in FIG. 3, or a C-shaped frame that is separated along its midline, such as midline 372 shown in FIG. 4 that is secured together with, for example, fasteners, adhesives, or welding.

The touch sensitive structure or screen of the sensor assemblies described herein is typically a rectangular piece of glass or other transparent material that is rigid or semi-rigid. The thickness of the screen may vary depending on what characteristics of the sensor or display device are considered most important. For example, if the thickness of the sensor (for example, defined by height H in FIG. 4) is critical for reducing the thickness of the display device, the thickness of the screen can be reduced to a minimum. However, reduction in the thickness of the screen typically makes the touch sensitive structure less rigid and more compliant such that a greater touch input force and more motion of the screen is required to meet threshold force values. In some case though, a more compliant screen is less susceptible to breaking due to impact forces and would be more desirable. A thicker screen, on the other hand, may require less movement of the structure and less force to meet the threshold. Less movement of the structure may actually reduce the amount of gap required between a touch surface of the screen and the frame of the sensor assembly (see gap G in FIG. 4), which could translate into a sensor thickness that is comparable to the thickness of a sensor having a thinner touch sensitive structure.

Figure 18:
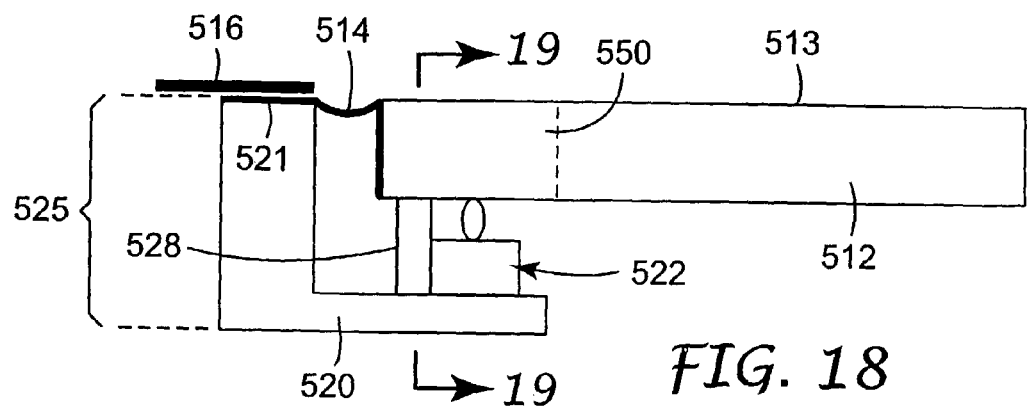
FIG. 18 is cross-sectional view of another embodiment of a display assembly illustrating one example of a flush mounted sensor assembly according to principles of the invention.
Figure 19:
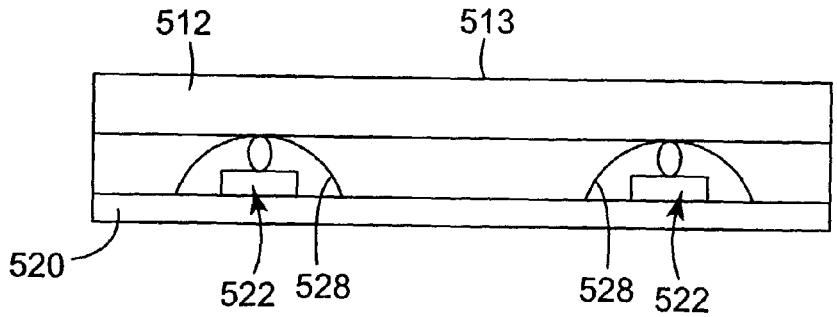
FIG. 19 is a cross-sectional view of the display assembly of FIG. 18 taken along line 19-19.

An additional embodiment of the present invention that incorporates principles of the invention disclosed above is display 500 shown in the cross-sectional views of FIGS. 18 and 19. Display 500 includes a force-based touch assembly 525 having a screen 512 with a touch surface 513, a membrane 514, a frame 520, and a transducer 522. Touch surface 513 is substantially flush with an upper surface 521 of frame 520, and seal 514 extends between screen 512 and upper surface 521. Display 500 may also include a bezel 516 that is positioned above upper surface 521 and laterally spaced apart from touch sensitive surface 512. Display 500 may also include spring members 528 that secure the touch sensitive structure 512 to frame 520 and provide a pre-load force between touch sensitive structure 512 and transducer 522. Touch sensitive structure 512 may include a blocked out area 550 that is opaque and shields transducer 522 and spring member 528 from view by an operator of display 500.

Figure 20:
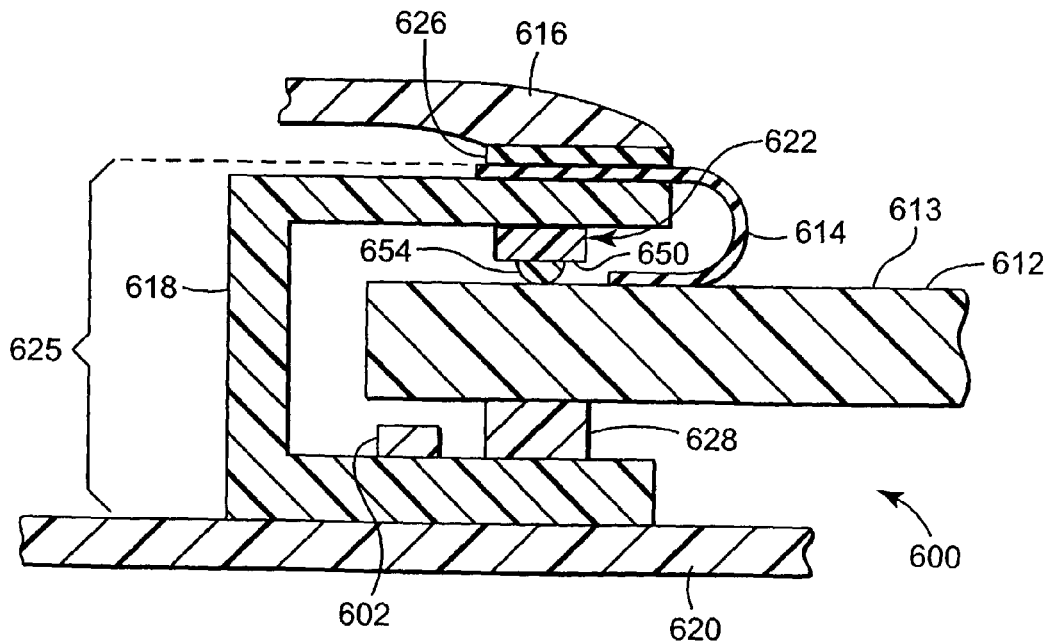
FIG. 20 is a cross-section view taken along line A-A of the display assembly shown in FIG. 1 illustrating a fourth example of a sensor assembly according to principles of the invention.

Another example of a display 600 incorporating principles of the present invention is illustrated in FIG. 20. Display 600 includes a screen 612, a membrane 614, a frame 618, and a transducer 622 having a base 650 and a contact 654. Display 600 may also include a bezel 616, a device subframe 620, and a bezel seal 626. An assembly 625 of some of the components of display 600 may be independently mounted to device subframe 620 and positioned adjacent bezel 616. Display 600 is unique from displays 100, 200, 300 in that the transducer 622 is positioned above screen 612 so that it contacts an upper surface 613 of screen 612. Display 600 may also include a preload spring 628 that provides a preload force to screen 612 to maintain constant contact between screen 612 and transducer 622. Thus, a touch input to upper surface 613 moves screen 612 away from transducer 622 to unload the transducer from the preload force. Determining the location of an intended touch to upper surface 613 may be related to how far screen 612 is moved away from transducer 622 (how much transducer 622 is unloaded).

Display 600 may also include a position stop 602 positioned at a location relative to screen 612 to limit movement of screen 612 away from transducer 622. One embodiment of position stop 602 is configured to promote constant contact between screen 612 and transducer 622.

In another embodiment of the invention (not shown), the sealing membrane may be configured to create a seal directly between the screen and bezel of the display. One application for such a sealing membrane configuration may be a display that does not have a frame member separate from the subframe of the display. The screen in this configuration may be captured between the bezel and the subframe, and the sealing membrane may be secured to the screen and the bezel to form a seal there between. In another embodiment, the display is comparable to displays 100, 200, 300, but the membrane 114, 214, 314 is secured to the screen 112, 212, 312 and bezel 116, 216, 316 rather than frame 124, 224, 318. Because the membrane is compliant in the normal direction, the membrane may permit free movement of both the screen and the bezel, if the bezel is deformable or otherwise movable. Thus, the membrane may be used to create a seal between two movable members.

In a yet further embodiment, the membrane may be configured to create a seal between the screen and another structure of the display besides the frame or seal. For example, the membrane may be secured to the screen and to the subframe or other structure of the display. Preferably, such an embodiment may provide at least a liquid and particle seal between the top, touch sensitive surface of the screen and the bottom surface of the screen.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A force-based touch sensor assembly comprising a frame, a screen having inner and outer surfaces, a seal for inhibiting passage between the frame and the screen, and a force activated transducer positioned adjacent the screen for detecting forces pushing through the screen due to a touch input, the seal comprising:

a flexible membrane having first and second surfaces and first and second sides, the first side capable of being mounted to the frame, and the second side capable of being mounted to the screen;

whereby the membrane is configured and arranged so that mounting the membrane to the frame and screen creates the seal without passing extraneous forces to the transducers, wherein the first and second sides of the membrane are brought together so as to form a cylindrical shaped seal, and the cylindrically shaped seal is capable of being secured to the frame and the outer surface of the screen to form the seal.

2. A method of producing a seal member for a force-based touch sensor assembly, comprising:

aligning strips of seal membrane in a shape that approximates a periphery of a touch sensitive structure of the force-based touch sensor assembly; and securing the strips of seal membrane together to form a continuous seal member;

whereby the seal member is configured so as to be capable of being secured to the touch sensitive structure and a frame of the forced-based touch sensor assembly to form a complete seal between the touch sensitive structure and the frame, wherein two of the strips of seal membrane are simultaneously cut to a predetermined length and secured together in a single step.

3. A method of producing a seal member for a force-based touch sensor assembly, comprising:

aligning strips of seal membrane in a shape that approximates a periphery of a touch sensitive structure of the force-based touch sensor assembly; and securing the strips of seal membrane together to form a continuous seal member;

whereby the seal member is configured so as to be capable of being secured to the touch sensitive structure and a frame of the forced-based touch sensor assembly to form a complete seal between the touch sensitive structure and the frame, further comprising the step of forming strips of seal membrane from material selected from a group of materials consisting of polyethylene, polypropylene, polyurethane, polyamide, fluoropolymer or polyvinylchloride.

4. A seal for a force-based touch sensor assembly, the assembly comprising a frame, a touch sensitive structure, a seal, and a force activated transducer associated with the touch sensitive structure, the seal comprising:

a continuous piece of compliant material secured to the touch sensitive structure and the frame, the compliant material being configured such that a maximum force exerted upon the touch sensitive structure by the compliant material is an order of magnitude less or smaller than a minimum recognized touch input force to the touch sensitive structure.

5. The seal of claim 4, wherein the maximum force exerted upon the touch sensitive structure by the compliant material is 1/50 or less of a minimum recognized touch input force to the touch sensitive structure.

6. The seal of claim 4, wherein the seal is configured such that the seal can be compressed without triggering a false touch input due to forces being transferred from the compliant material and the touch sensitive structure.

7. A force-based touch display device, comprising:
a housing;
a movable force-based touch sensitive screen;
a sealing means adapted and configured to provide a liquid and particle seal between the screen and the housing, and to promote essentially unrestricted motion of the screen without passing extraneous forces to the screen that result in false touches to the screen or skewing of touch location determination of intended touches to the screen, wherein the sealing means has a C-shaped cross-section.

8. A force-based touch display device, comprising:
a housing;
a movable force-based touch sensitive screen;
a sealing means adapted and configured to provide a liquid and particle seal between the screen and the housing, and to promote essentially unrestricted motion of the screen without passing extraneous forces to the screen that result in false touches to the screen or skewing of touch location determination of intended touches to the screen, wherein the sealing means has a closed cross-section.

9. A force-based touch display device, comprising:
a housing;
a movable force-based touch sensitive screen;
a sealing means adapted and configured to provide a liquid and particle seal between the screen and the housing, and to promote essentially unrestricted motion of the screen without passing extraneous forces to the screen that result in false touches to the screen or skewing of touch location determination of intended touches to the screen, wherein the sealing means is a compliant foam material.

10. A force-based touch display device, comprising:
a housing;
a movable force-based touch sensitive screen;
a sealing means adapted and configured to provide a liquid and particle seal between the screen and the housing, and to promote essentially unrestricted motion of the screen without passing extraneous forces to the screen that result in false touches to the screen or skewing of touch location determination of intended touches to the screen, wherein the membrane is a composite material.

* * * * *